United States Patent
Kong et al.

(10) Patent No.: US 10,494,543 B2
(45) Date of Patent: Dec. 3, 2019

(54) SHATTER-PROOF GLASS COATING COMPOSITION, TEMPERED SHATTER-PROOF GLASS USING IT AND METHOD FOR MANUFACTURING TEMPERED SHATTER-PROOF GLASS

(71) Applicants: Hyundai Motor Company, Seoul (KR); Noroo Bee Chemical Co., Ltd., Cheonan, Chungcheongnam-do (KR)

(72) Inventors: Nak Kyoung Kong, Gyeonggi-do (KR); Ki Hong Lee, Seoul (KR); Jong Min Park, Incheon (KR); Tae Soo Jung, Gyeonggi-Do (KR); Bock Ceol Lee, Gyeonggi-Do (KR); Keon Soo Jin, Ulsan (KR); Jae Beom Ahn, Gyeonggi-Do (KR); Young Seok Kim, Chungcheongnam-Do (KR); Yong Chul Lee, Chungcheongnam-Do (KR)

(73) Assignees: Hyundai Motor Company, Seoul (KR); Noroo Bee Chemical Co., Ltd., Cheonan, Chungcheongnam-do (KR)

( * ) Notice: Subject to any disclaimer, the term of this patent is extended or adjusted under 35 U.S.C. 154(b) by 284 days.

(21) Appl. No.: 15/347,917

(22) Filed: Nov. 10, 2016

(65) Prior Publication Data
US 2017/0166774 A1 Jun. 15, 2017

(30) Foreign Application Priority Data
Dec. 14, 2015 (KR) ........................ 10-2015-0178616

(51) Int. Cl.
*C09D 175/04* (2006.01)
*C08G 18/62* (2006.01)
(Continued)

(52) U.S. Cl.
CPC ............ *C09D 175/04* (2013.01); *C03C 17/30* (2013.01); *C03C 17/322* (2013.01);
(Continued)

(58) Field of Classification Search
CPC .............. C09D 175/04; C08G 18/6233; Y10T 428/24777; Y10T 428/24793; Y10T 428/24802
See application file for complete search history.

(56) References Cited

U.S. PATENT DOCUMENTS

2003/0149227 A1 * 8/2003 Okazaki .................. C08F 20/28
528/310

FOREIGN PATENT DOCUMENTS

| JP | 2003-313493 A | 11/2003 |
| JP | 2013-107814 A | 6/2013 |

(Continued)

*Primary Examiner* — Gerard Higgins
(74) *Attorney, Agent, or Firm* — Mintz Levin Cohn Ferris Glovsky and Popeo, P.C.; Peter F. Corless (57) ABSTRACT

Disclosed are a coating composition applied on a tempered glass, the tempered glass preventing shattering when impacts are applied, and a manufacturing method thereof. The coating composition comprises a caprolactone-modified acryl resin, an acryl polyol, a polyurethane resin and the like, such that the tempered glass has improved strength and the ceramic part can be removed from a conventional tempered glass. Further provided is a vehicle product such as a vehicle glass component, such that passengers in the vehicle can be protected from the shattering of the broken tempered glass.

19 Claims, 3 Drawing Sheets

(51) Int. Cl.
*C03C 17/30* (2006.01)
*C03C 17/32* (2006.01)
*C03C 17/34* (2006.01)
*C09D 133/14* (2006.01)

(52) U.S. Cl.
CPC ........ *C03C 17/324* (2013.01); *C03C 17/3405* (2013.01); *C08G 18/6233* (2013.01); *C09D 133/14* (2013.01); *C03C 2217/78* (2013.01); *Y10T 428/24777* (2015.01); *Y10T 428/24793* (2015.01); *Y10T 428/24802* (2015.01)

(56) References Cited

FOREIGN PATENT DOCUMENTS

| | | |
|---|---|---|
| JP | 2015-000822 A | 1/2015 |
| KR | 2002-0003531 | 1/2002 |
| KR | 10-2006-0093132 A | 8/2006 |
| KR | 10-2013-0062576 A | 6/2013 |
| KR | 10-2013-0078644 A | 7/2013 |
| KR | 10-1465985 | 11/2014 |
| KR | 10-2015-0105764 | 9/2015 |

* cited by examiner

SHATTER-PROOF GLASS COATING COMPOSITION, TEMPERED SHATTER-PROOF GLASS USING IT AND METHOD FOR MANUFACTURING TEMPERED SHATTER-PROOF GLASS

CROSS-REFERENCE TO RELATED APPLICATION

This application claims under 35 U.S.C. § 119(a) the benefit of priority to Korean Patent Application No. 10-2015-0178616 filed on Dec. 14, 2015, the entire contents of which are incorporated herein by reference.

BACKGROUND (a) Technical Field

The present invention relates to a coating composition for a glass, a shatter-proof tempered glass using the coating composition and a method for manufacturing the same. The coating composition may comprise a caprolactone-modified acryl resin, an acryl polyol, and a polyurethane resin, which are added in a small amount, and may be coated on a tempered glass such that shattering when the tempered glass is broken may be prevented.

(b) Background Art

The conventional shatter-poof tempered glass technology has been used in the automobile industry and building industry and the tempered glass manufactured can withstand a large impact. For example, when an impact over a limit level is applied, the tempered glass broken into a number of small pieces may be randomly shattered, which may result in a very dangerous situation. In this regard, research to solve the problems has been conducted.

Figure 1:
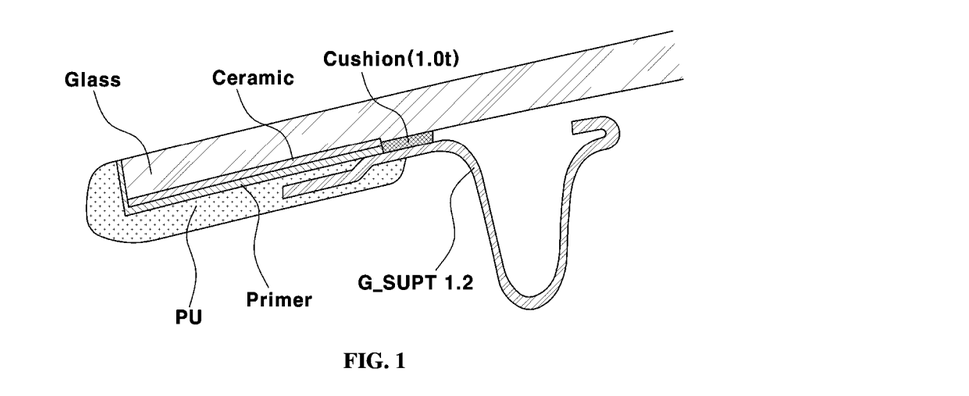
FIG. 1 is a cross sectional view illustrating a conventional panorama roof glass.
Figure 2:
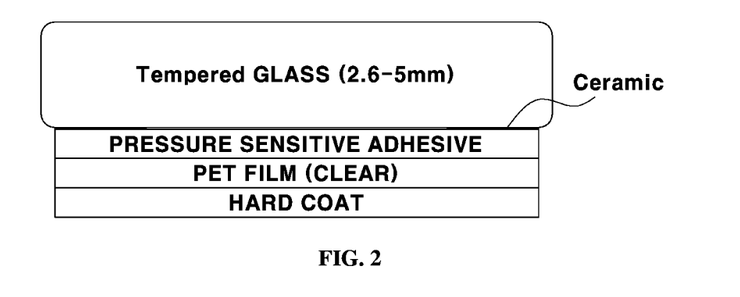
FIG. 2 illustrates a conventional tempered glass having a shatter-proof function when a glass is broken.

As illustrated in FIG. 1, as for a typical tempered glass used in a vehicle, an adhesive substance and a PET film may be attached to the lower surface of the tempered glass in order to prevent the shattering of the tempered glass which has been broken. In this case, since the tempered glass is likely to be easily broken by even a small impact due to the presence of a ceramic layer or a ceramic part, the tempered glass may be considered a major factor which may risk the safety of passenger in the vehicle when the tempered glass is applied to a panorama roof glass of a vehicle. Further, the strength of the tempered glass may become very poor since the ceramic part is present at a panorama roof glass of a vehicle.

For this reason, it is urgently needed to employ a coating composition and a tempered glass using the same which are able to enhance strength in such a way to remove the ceramic part in a conventional tempered glass, the configuration of which may substitute the above ceramic part.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with prior art.

The inventors of the present invention have made efforts to solve dangerous situations which may occur when the panorama roof of a vehicle is broken, and, as a result, found out that it may be possible to manufacture a new tempered glass which can be used in a vehicle glass component since the new tempered glass has good image clarity and good durability in terms of a heat-resistance property, a water resistance property, a weather resistance property, and the like. The above new tempered glass may be manufactured in such a way that a ceramic part (a coating layer coated with ceramic including Si component) typically used in a conventional tempered glass can be removed, and a coating composition comprising a caprolactone-modified acryl resin, an acryl polyol, and a small amount of a polyurethane resin can be coated on the tempered glass.

In preferred aspects, the present invention provides a coating composition for a shatter-proof glass. Further provided is a tempered glass comprising the coating composition such that a shatter-proof function may be ensured when a glass coated with a coating layer is broken. Additionally, the present invention provides a method for manufacturing the above tempered glass.

Still further provided is a vehicle panorama roof comprising the above tempered glass.

Also provided is a vehicle that comprising the coating composition as described herein.

In one aspect, the present invention provides a coating composition which may comprise: (a) an amount of about 50 to 60% by weight of a caprolactone-modified acryl resin: (b) an amount of about 10 to 20% by weight of an acryl polyol; (c) an amount of about 10 to 20% by weight of a polyurethane resin; (d) an amount of about 0.1 to 1.5% by weight of a reaction catalyst; (e) an amount of about 0.1 to 1.5% by weight of a wet additive; (f) an amount of about 1.0 to 1.5% by weight of a pigment; and (g) an amount of about 5 to 20% by weight of a solvent, all the % by weights herein are all the % by weights based on the total weights of the components (a)-(g). Preferably, the coating composition may further comprise a hexamethylenedisocyanate trimer resin as a hardener.

Further provided is a coating composition which may consist essentially of, essentially consist of, or consist of: (a) an amount of about 50 to 60% by weight of a caprolactone-modified acryl resin: (b) an amount of about 10 to 20% by weight of an acryl polyol; (c) an amount of about 10 to 20% by weight of a polyurethane resin; (d) an amount of about 0.1 to 1.5% by weight of a reaction catalyst; (e) an amount of about 0.1 to 1.5% by weight of a wet additive; (f) an amount of about 1.0 to 1.5% by weight of a pigment; (g) an amount of about 5 to 20% by weight of a solvent, all the % by weights herein are based on the total weights of the components (a)-(g), and a hexamethylenedisocyanate trimer resin as a hardener.

Preferably, (a) the caprolactone-modified acryl resin may have a solid content of about 70 wt % based on the total weight of the caprolactone-modified acryl resin, and a weight-average molecular weight of the caprolactone-modified acryl resin may be of about 8,000 to 20,000, and a hydroxyl group content may be of about 1 to 4%.

Preferably, (b) the acryl polyol may have a solid content of about 55 wt % based on the total weight of the acryl polyol, a weight-average molecular weight of the acryl polyol may be of about 12,000 to 25,000, a hydroxyl group content may be of about 0.2 to 2%, and a glass transition temperature of the acryl polyol, is of about 70 to 80° C.

Preferably, (c) the polyurethane resin may have a hydroxyl group content of about 0.5 to 1.0%, and a weight-average molecular weight of the polyurethane resin is of about 40,000 to 43,000, and the polyurethane resin has a solid content of about 70 to 80 wt % based on the total weight of the polyurethane resin.

Preferably, the reaction catalyst (d) may be dibutyltindilaurate.

A mixing weight ratio of a total amount of (a) the caprolactone-modified acryl resin, (b) the acryl polyol; (c) the polyurethane resin; (d) the reaction catalyst; (e) the wet additive; (f) the pigment; and (g) the solvent to the hardener may be of about 2 to 4:1.

Preferably, a ford cup (FORD CUP#4, 25° C.) viscosity of the coating composition may be of about 18 to 20 seconds.

The coating composition may be transparent. Alternatively, the coating composition may be opaque. The transmittance determining the transparency or opaqueness suitably may be adjusted by a type or a concentration of the pigment used in the coating composition.

The term "transparent" material or "transparent" resin, as used herein, may refer to a material having substantial transmittance of a fraction of light, such as visible light. For instance, substantial amount of visible light such as of about 50%, about 60%, about 70%, about 80%, about 90%, about 95%, about 99%, or greater thereof may transmit or pass through the transparent material or resin.

The term "opaque" material or "opaque" resin, as used herein, may refer to a material blocking or screening substantial transmittance of a fraction of light, such as visible light. Alternatively, the opaque material or resin may reflect substantial transmittance of a fraction of light. For instance, substantial amount of visible light such as of about 50%, about 60%, about 70%, about 80%, about 90%, about 95%, about 99%, or greater thereof may be blocked or reflected by the opaque material or resin.

Accordingly, a tempered glass may be manufactured to have a shattering prevention function when the tempered glass is broken. The tempered glass of the present invention may comprise; a primer layer which may be formed on a surface of the tempered glass; and a coating layer comprising a coating composition as described herein on the primer layer.

The primer layer suitably may be formed by coating with a silane primer.

A pre-primer layer may be formed between the tempered glass and the primer layer, and the pre-primer layer is a transparent layer formed with a silane primer.

Preferably, the primer layer may be formed at a width of about 5 to 15 cm at an outer edge of the tempered glass.

Preferably, the coating layer may have an average thickness of about 50 to 80 μm, and the coating layer may be coated on a portion where the primer layer may be formed or may be coated on a front surface of the tempered glass which includes the primer layer.

In one preferred aspect, the present invention may provide a method of manufacturing a tempered glass. The method may comprise: coating a primer on one or more surface of a tempered glass to form a primer layer; coating the coating composition of claim 1 on the primer layer and hardening the coating composition at a suitable temperature of about 70 to 90° C. for about 20 to 40 minutes.

In one preferred aspect, the present invention provides a vehicle part that comprises the tempered glass comprising the coating composition as described above. Preferably, the vehicle part may be a vehicle panorama roof.

Further provided is a vehicle comprising the coating composition as described herein.

Other aspects and preferred embodiments of the invention are discussed infra.

Accordingly, the coating composition according to the present invention may have a high image clarity, and the exterior of the coated subject (e.g. tempered glass) may look good after coating. In addition, the exterior of the tempered glass may not be affected.

When the coating composition of the present invention is applied to a tempered glass, the shatter-proof function may be enhanced by removing the ceramic part, which was formed on a conventional tempered glass and had a weak strength, and introducing a polyurethane coating layer. Accordingly, the passengers in the vehicle can be protected.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention will be described below as an example of the implementation.

The coating composition for a shatter-proof glass according to the present invention may comprise (a) an amount of about 50 to 60% by weight of a caprolactone-modified acryl resin, (b) an amount of about 10 to 20% by weight of an acryl polyol, (c) an amount of about 10 to 20% by weight of a polyurethane resin, (d) an amount of about 0.1 to 1.5% by weight of a reaction catalyst, (e) an amount of about 0.1 to 1.5% by weight of a wet additive, (f) an amount of about 1.0 to 1.5% by weight of a pigment, and (g) an amount of about 5 to 20% by weight of a solvent, all the % by weights are based on the total weights of the components (a)-(g). In particular, the coating composition may comprise hexamethylenediisocyanate trimer resin as a hardener.

The main components of the coating composition refer to the total amounts (weights) of components (a)-(g), i.e. the total weights of (a) the caprolactone-modified acryl resin, (b) the acryl polyol; (c) the polyurethane resin; (d) the reaction catalyst; (e) the wet additive; (f) the pigment; and (g) the solvent.

For the acryl resin, a polymer suitably may be prepared in a solution by radically polymerizing various kinds of monomers using a thermal decomposition initiator, wherein the above monomers, for example, acrylic-based or vinyl-based monomers, have a double bond.

Preferably, the acrylic-based or vinyl-based monomers may be one or more selected from the group consisting of methylacrylate, ethylacrylate, isopropylacrylate, N-butylacrylate, ethylhexylacrylate, methylmethaacrylate, ethylmethaacrylate, butylmethaacrylate, hexylmethaacrylate and laurylmethaacrylate, which are non-functional monomers. The carboxylic functional group monomer suitably may be one or more selected from the group consisting of acrylic acid, methaacrylic acid, maleic acid, itaconic acid and chlorous acid. The hydroxyl group monomer suitably may be one or more selected from the group consisting of 2-hydroxymethaacrylate, hydroxypropylacrylate, 4-hydroxybutylacrylate and 2-hydroxyetylacrylate. In addition the vinyl-based monomer suitably may be one or more selected from a group consisting of acrylamide, N-methylolacrylamide, glycidylmethaacrylate, styrene, vinyltoluene, acryllonitrile, and vinylacetate.

Preferably, the caprolactone-modified acryl resin may be synthesized using caprolactone triol. The synthesized resin may have a good elasticity and scratch resistance. As compared to an acryl resin having the same glass transition temperature (Tg), the synthesized resin may have a good hardness and chemical resistance and a good elastic restoring force and a good tensile strength.

The caprolactone-modified acryl resin (a) as used herein may be a low viscosity type acryl resin wherein a solid content may be of about 70 wt % based on the total weight of the caprolactone-modified acryl resin, the weight-average molecular weight thereof may be of about 8,000 to 20,000, and the content of hydroxyl group may be 1 to 4%, and the glass transition temperature thereof may be of about −10 to 20° C. Preferably, an amount of about 50 to 60% by weight of the caprolactone-modified acryl resin may be contained based on the total weights of the main components.

If the weight-average molecular weight of the caprolactone-modified acryl resin is less than about 8,000, there may be a limit to securing the reliability. If the weight-average molecular weight of the caprolactone-modified acryl resin is greater than about 20,000, its commercialization may be bad, and workability may have a limit. It is therefore preferred that the caprolactone-modified acryl resin is used within the above range.

Moreover, if the content of the hydroxyl group is less than about 1%, there may be a limit to the formation of a crosslink density after it reacts with isocyanate, and thus it is difficult to obtain elasticity. If the content of hydroxyl group is greater than about 4%, there may be a limit to the pot life when being mixed with a hardener, so the acryl resin should be used within the above range. Moreover, for the glass transition temperature, a resin may be used within the above range so as to maximize elasticity.

Furthermore, when the caprolactone-modified acryl resin is included in an amount less than about 50% by weight, an impact resistance and an elastic restoring force may be reduced. When the caprolactone-modified acryl resin is included in an amount greater than about 60% by weight, a tacky phenomenon may occur during the formation of a coating. Accordingly, reactivity, a weather resistance and a painting workability may be reduced. So, it is preferred to use within the above range.

Next, for the acryl polyol which is the acryl resin, a polymer may be suitably prepared by radically polymerizing various kinds of monomers having a vinyl type double bond of an acrylic acid ester or a methacrylic ester in a solution by using a thermal decomposition initiator.

The acryl polyol (b) as used herein preferably may have an 55 wt % of a solid content based on the total weight of the acryl polyol, a weight-average molecular weight of the acryl polyol may be of about 12,000 to 25,000, the acryl polyol may have 0.2 to 2% of a hydroxyl group in content, and a glass transition temperature thereof may be of about 70 to 80° C.

When the weight-average molecular weight of the acryl polyol is less than about 12,000, there may be a limit to reaching the above glass transition temperature. When the weight-average molecular weight of the acryl polyol is greater than about 25,000, acryl polyol may be solidified (e.g. Gel) during the resin synthesis. For this reason, it is preferred to synthesize and use it within the above molecular range. When the content of the hydroxyl group is less than about 0.2%, there may be a limit to obtaining a reliability and the reactivity may be reduced. When the content of the hydroxyl group is greater than about 2%, impact resistance of the formed coating having a high reactivity may be reduced, so the acryl polyol in the above range is used.

Preferably, an amount of about 10 to 20% by weight of the acryl polyol may be used with respect to the total weights of the main components. When the acryl polyol is included less than about 10% by weight, the coating may become tacky and thus a water resistance property may be reduced. When the acryl polyol is included greater than about 20% by weight, the exterior may look bad upon inputting, and the coating may be hardened. Accordingly, the elongation and elastic restoring force may be reduced, so it should be used within the above range.

The polyurethane resin (c) according to the present invention suitably may be synthesized by reacting the polycarbonate polyol with isocyanate. For example, the polyurethane resin (c) may be prepared by reacting an amount of about 5 to 30% by weight of isocyanate, an amount of about 2 to 10% by weight of polycarbonate polyol, an amount of about 30 to 60% by weight of polyesterdiol and an amount of about 5 to 25% by weight of a solvent, based on the total weight of the polyurethane resin.

The isocyanate may have two or more average functional groups. The isocyanate suitably may include selected from a group consisting of toluenediisocyanate, 4,4-diphenyl methanediisocyanate, hexamethylenediisocyanate, isophoronediisocyanate, dicyclohexylmethanediisocyanate and a multi-functional isocyanate induced from the above. Preferably, the isocyanate suitably may include one or more may be selected from a group consisting of isophoronediisocyanate and dicyclohexylmethanediisocyanate. Moreover, the polycarbonate polyol may be a polyol which has a weight-average molecular weight range of about 500 to 5,000, thereby satisfying the impact and weather resistances.

The polyurethane resin (c) as used herein preferably comprise an amount of about 0.5 to 1% of hydroxyl group value, and the weight-average molecular weight of the polyurethane resin suitably may be of about 40,000 to 43,000 of, and the polyurethane resin may include about 70 to 80 wt % of a solid content based on the total weight of the polyurethane resin.

When the hydroxyl group of the polyurethane resin is less than about 0.5%, the content of the hydroxyl group which may react with isocyanate may be reduced, and thus the reactivity may be significantly reduced. When the hydroxyl group of the polyurethane resin is greater than about 1%, there may be a limit to obtaining an elastic performance of the urethane resin. When the weight-average molecular weight of the polyurethane resin is less than about 40,000, the effect of shatter-proof function may not be sufficient. When the weight-average molecular weight of the polyurethane resin is greater than about 43,000, there may be limit when a urethane resin having a high viscosity is synthesized and used during the synthesizing process. The polyurethane resin within the above range therefore is preferably used.

The polyurethane resin may be included in an amount of about 10 to 20% by weight based on the total weights of the main components. When the polyurethane resin is included less than about 10% by weight, an impact resistance, a recovery force, and a weather resistance may be reduced. When the polyurethane resin is included greater than about over 20% by weight, the exterior may look bad upon inputting, and the painting workability may become bad. It is therefore preferably used within the above range.

The reaction catalyst (d) may be a urethane reaction catalyst. A dibutyltindilaurate suitably may be used for the above catalyst to enhance a reaction speed between a hydroxyl group and the hardener (isocyanate). When the reaction catalyst is added in an amount greater than about the predetermined amount, for example, greater than about 1.5 wt % based on the total weights of the main components, the pot life may be reduced, thereby lowering the workability. Accordingly, an amount of about 0.1 to 1.5% by weight may be preferably used.

The wet additive (e) may be an additive of polydimethylsiloxane to enhance wetting property and the leveling of a coating during the painting. The wet additive may be included in an amount of about 0.1 to 1.0% by weight based on the total weights of the main components.

The pigment (f) may have good transparency and a good tinting strength while minimizing the formation of stains during the paining work since nano-sized particles are dispersed. The above pigment may not limited thereto, and any pigment mainly used in the field of the present invention may be available. The pigment may be, for example, a HTP BLACK product by MIKUNI Corporation.

The solvent (g) may facilitate easier painting work and is able to provide a predetermined flatness after the coating and a good looking exterior by adjusting the speed of volatilization of the solvent. The solvent may be included in an amount of about 5 to 20% by weight, or particularly, of about 10~15% by weight of the solvent based on the total weights of the main components.

The coating composition preferably may further comprise the hardener and hexamethyleneisocyanate having a good non-yellowing type and a good weather resistance suitably may be used as the hardener. The main components of the coating composition comprising (a) the caprolactone-modified acryl resin, (b) the acryl polyol; (c) the polyurethane resin; (d) the reaction catalyst; (e) the wet additive; (f) the pigment; and (g) the solvent and the hardener may be mixed in a weight ratio of about 2 to 4:1, and suitably, a dilution solvent may be used. Preferably, the ford cup (FORD CUP #4, 25° C.) viscosity of the dilution solvent is 18~20 seconds.

When the above viscosity is less than about 18.0 seconds, the paint may run down during the painting work, so there may be a limit to obtaining a desired thickness. When the above viscosity is greater than about 20.0 seconds, the exterior (a leveling property) may look bad due to a high viscosity. So, the coating composition within the above range is employed.

In order to obtain a good attachment to the glass, a primer layer such as a silane primer (BETASEAL™ 43518, Dow corporation, USA) may be first coated, and then the coating composition of the present invention may be coated thereon, thereby forming a painted layer which is able to enhance the strength of the tempered glass.

Preferably, the present invention provides a tempered glass having a shatter-proof function when the tempered glass is broken. The shatter-proof tempered glass prepared may comprise; a primer layer formed on a surface of the tempered glass; and a coating layer comprising the coating composition and formed on the above primer layer.

Moreover, the present invention provides a method for manufacturing a tempered glass which has a shatter-proof function when the tempered glass is broken. Preferably, a black or transparent silane primer may be coated on a surface of the tempered glass, and the coating composition may be coated and hardened at a temperature of about 70 to 90° C. for about 20 to 40 minutes, thereby forming a polyurethane coating layer.

As mentioned above, the primer layer may be a silane primer provided to obtain a good attachment to the glass. The primer layer may be coated by about 1 μm on one surface of the tempered glass, and the setting may be maintained at a room temperature for about 5 minutes, and the coating composition having the above shatter-proof function may be coated, thereby enhancing the strength of a tempered glass while removing the ceramic part used in the related art.

The polyurethane coating layer formed by coating the coating composition having the shatter-proof function may have an average thickness of about 50 to 80 μm, and the polyurethane coating layer may be coated only on a portion where the primer layer is formed or may be coated on a front surface of the tempered glass which includes the above primer layer.

Figure 3A:
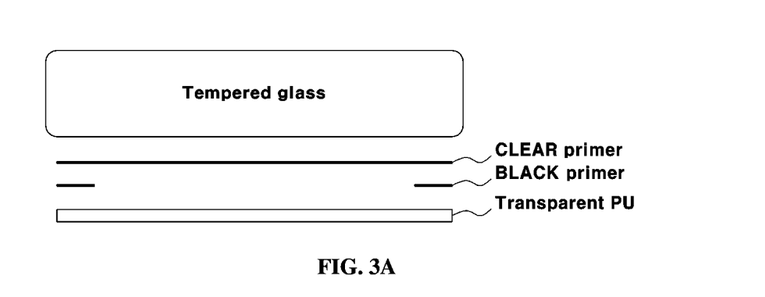
FIG. 3A illustrates an exemplary tempered glass comprising an exemplary coating composition, and clear and black primers according to an exemplary embodiment of the present invention.
Figure 3B:
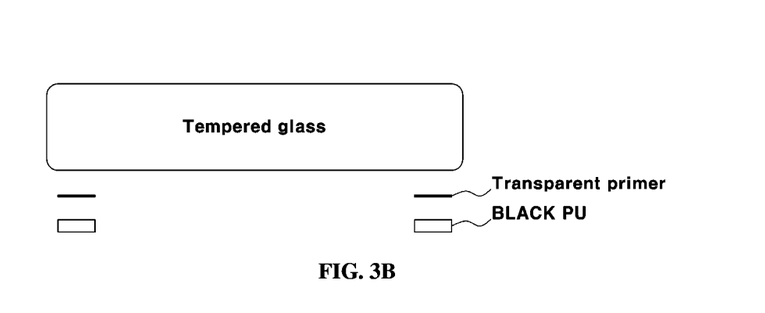
FIG. 3B illustrates an exemplary tempered glass comprising an exemplary coating composition, and a transparent primers according to an exemplary embodiment of the present invention.

FIG. 3A and FIG. 3B are cross sectional views illustrating a tempered glass according to the present invention. The present invention is able to provide the tempered glass having two configurations illustrated in FIG. 3A and FIG. 3B.

As illustrated in FIG. 3A, when the black primer layer is formed with a width of about 10 to 15 cm on an outer edge of the tempered layer, a transparent pre-primer layer may be further provided. The transparent (polyurethane) coating layer may be coated on the front surface of the tempered glass including the primer layer.

As illustrated in FIG. 3B, when the transparent primer layer is formed with a width of about 10 to 15 cm on an outer edge of the tempered glass, the black (polyurethane) coating layer may be coated only on the portion where the primer layer is formed.

In the above tempered glass, since the ceramic part is removed and the coating composition containing a polyurethane resin is coated, an impact absorption may be improved thereby improving strength. These results were confirmed after the tests which will be described later.

The coating layer comprising the coating composition suitably may have an average thickness of about 50 to 80 μm. When the black or transparent silane primer is coated on the substrate (e.g. tempered glass), the shatter-proof glass coating composition may be coated and hardened at a temperature of about 70 to 90° C. for about 20 to 40 minutes. When the thickness of the coating layer is less than about 50 μm, the impact resistance may be degraded, and when the thickness of the coating layer is greater than about 80 μm, an unnecessary tiny lump of the coating may be formed at an end portion of the material during the formation of the coating. The above range therefore may be preferred.

As a representative example, the manufactured tempered glass may be employed to the panorama roof of a vehicle. As compared to the conventional tempered glass, the tempered glass according to the present invention is able to provide the strength which is enhanced greater than about 30% on average, thereby effectively protecting the passengers.

The present invention will be described in details below along with the embodiments. These embodiments are provided for only illustrative purposes, and the copes of the present invention is not limited thereto.

EXAMPLE

Manufacturing Examples 1~2 and Comparison Manufacturing Examples 1-5: Manufacturing of a Shatter-proof Glass Coating Composition The main components were prepared by mixing the components and contents as shown in Table 1. The hardener was the HI-100 (BASF, USA). The main components and the hardener were mixed in a weight ratio of 3:1, and the dilution solvent was prepared by mixing acetate and ketone. The viscosity of the ford cup (FORD CUP#4, 25° C.) was 20 seconds.

TABLE 1

Compositions of main components (unit: % by weight)

| Classification | Comparison manufacturing example 1 | Comparison manufacturing example 2 | Comparison manufacturing example 3 | Comparison manufacturing example 4 | Comparison manufacturing example 5 | Manufacturing example 1 | Manufacturing example 2 |
|---|---|---|---|---|---|---|---|
| caprolactone-modified acryl resin [1] | 70 | 40 | 50 | 50 | 40 | 60 | 50 |
| acryl polyol [2] | 5 | 30 | 30 | 0 | 20 | 10 | 20 |
| Polyurethane resin [3] | 5 | 10 | 0 | 30 | 20 | 10 | 10 |
| Reaction catalyst [4] | 1.5 | 1.5 | 1.5 | 1.5 | 1.5 | 1.5 | 1.5 |
| Wet additive [5] | 1 | 1 | 1 | 1 | 1 | 1 | 1 |
| Pigment [6] | 1.5 | 1.5 | 1.5 | 1.5 | 1.5 | 1.5 | 1.5 |
| solvent [7] | 16 | 16 | 16 | 16 | 16 | 16 | 16 |
| Total contents | 100 | 100 | 100 | 100 | 100 | 100 | 100 |

[1] 70 wt % of solid content, 8,000~20,000 of weight-average molecular weight, 1~4% of hydroxyl group content(Noroobee Chemical Corporation)
[2] 55 wt % of solid content, 12,000~25,000 of weight-average molecular weight, 0.2~2% of hydroxyl group content, 70~80° C. of glass transition temperature(Noroobee Chemical corporation)
[3] 0.5~1.0% of hydroxyl group value, 40,000~43,000 of weight-average molecular weight, 70~80 wt % of solid content(Noroobee Chemical corporation)
[4] Dibutyl tin dilaurate, product name: D.B.T.D.L corporation name: Dongil chemical corporation (Japan)
[5] Product name: BYK-306 Corporation name: BYK
[6] HTP BLACK product, MIKUNI corporation
[7] Butyl acetate, methylisobutylketone Comparison Examples 1~5 and Examples 1~2: Manufacturing of Tempered Glass The tempered glass having a shatter-proof function when the tempered glass was broken was manufactured using the polyurethane coating composition manufactured in the comparison examples 1-5 and the examples 1-2.

Figure 4A:
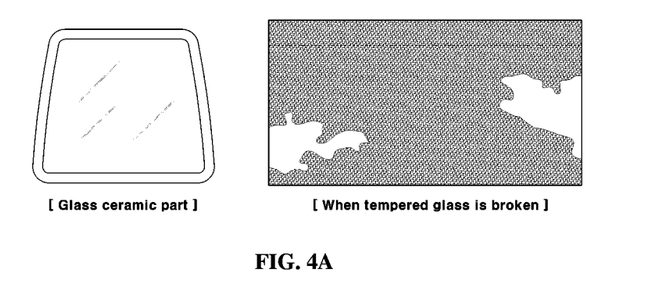
FIG. 4A illustrates a state where a conventional tempered glass having a ceramic part is broken.
Figure 4B:
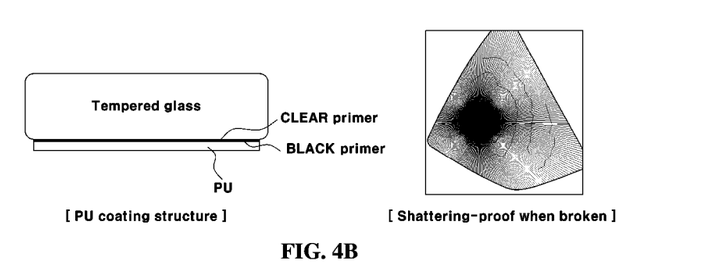
FIG. 4B illustrates a state where an exemplary tempered glass from which a ceramic part is removed according to an exemplary embodiment of the present invention is broken.

More specifically, a silane primer (BETASEAL™ 43518, Dow corporation, USA) was coated by about 1 µm on one surface of the tempered glass which had a thickness of 2.6-5 mm, and the setting was maintained at a room temperature for about 5 minutes, and the coating composition containing the polyurethane resin prepared in the examples 1~2 and the comparison examples 1-5 was coated and hardened at a temperature of 80° C. for 30 minutes to form a coating. Accordingly, the tempered glass having the configuration shown in FIG. 4B was manufactured.

Test Example: Measurements of Physical Properties

The tempered glass prepared in the comparison examples 1-5 and the examples 1-2 were subjected to the physical property measurements by the following physical property evaluation method, and the results of the measurements were shown in Table 2.

(1) Measurement of image clarity: The image clarity was measured using the wave scan-DOI by the BYK GARDNER Corporation. Here, the CF values which meant the total grades of gloss, image clarity, and orange peel were compared.

(2) Measurement of a tacky state of coating: The PEP film was placed on the coating test piece, and it was pressed with a weight of 300 g, and any presence of the tacky state (a mark) was checked after the film was removed. The evaluation was carried out at 1-5 levels, wherein 1 means that a mark didn't disappear, and 5 means that there was no mark.

(3) Measurement of an elastic restoring ratio: The test was carried out in accordance with the ASTM D 412 standard. More specifically, a Dumbell type test piece was prepared, and 30.0 mm checkpoint was marked ($L_1$) on the test piece of the ASTM D 412 D type, and the 90% elongated state was maintained for 10 minutes, and the grip was removed, and it was left alone on a flat place for 10 minutes, and the distance ($L_0$) between the gauge marks was measured again, and the elastic restoring ratio was checked.

$$\text{Elastic restoring ratio (\%)} = \frac{L_1}{L_0} \times 100$$

(4) Measurement of an elongation percentage (an elongation at break): The number 5 test piece was prepared in accordance with the ISO 527-1 standard, and the elongation at break of the coating was measured.

(5) Measurement of a heat resistance property: The test piece was left alone for 300 hours in the chamber of the test temperature condition at a temperature of 90±2° C. and was taken out, and the exterior evaluation and initial attachment tests were carried out.

(6) Measurement of weather resistance: Any change in the exterior was checked after scanning 2500 kJ/m$^2$ in accordance with the SAE J1960.

TABLE 2

A result of the physical property measurement

| Classification | Image clarity (CF value) | Tacky state (1~5 levels) | Elastic restoring ratio (%) | Elongation at break (%) | Heat resistance | Water resistance | Weather resistance |
|---|---|---|---|---|---|---|---|
| Targeted value | 70 | Less than or equal to 2 | Greater than or equal to 90% | Greater than or equal to 110% | good | good | good |
| Comparison example 1 | 75 | 4 | 100% | 130 | N.G | N.G | N.G |
| Comparison example 2 | 55 | 1 | 60% | 90 | good | good | good |
| Comparison example 3 | 60 | 2 | 70% | 90 | good | good | N.G |
| Comparison example 4 | 70 | 3 | 90% | 100 | good | N.G | good |
| Comparison example 5 | 60 | 1 | 80% | 90 | good | good | good |
| Example 1 | 70 | 2 | 100% | 120 | good | good | good |
| Example 2 | 70 | 2 | 95% | 110 | good | good | good |

*N.G: measurement was impossible.

As seen in Table 2, the comparison example 1 was a case where the caprolactone-modified acryl resin was used to excess. The elastic restoring ratio and the elongation at break were good. It was confirmed that even though a small amount of the polyurethane resin was used, the elasticity-related items were mostly good, but the heat resistance, the water resistance and the weather resistance which were related to the reliability of the coating were greatly degraded. The comparison example 2 was a case where a small amount of the caprolactone-modified acryl resin was used, and the acryl polyol resin was used to excess. In this case, it was confirmed that the weather resistance was satisfied, but the elasticity-related items were greatly degraded.

The comparison example 3 was a case where the polyurethane resin was not used. The tacky state was good, but the elastic restoring ratio was degraded, and in particular, the weather resistance was degraded. The comparison example 4 was a case where the acryl polyol was not used, and the polyurethane resin was used a lot. In this case, it was confirmed that the image clarity and the elasticity restoring ratio were good, but the crosslink density was lowered. Accordingly, the water resistance was bad, and the levels of the tacky states were increased.

The comparison example 5 was a case where a small amount of the caprolactone-modified acryl resin was used, and the contents of the acryl polyol and the polyurethane resin were increased. The heat resistance, the water resistance and the weather resistance were satisfied, and the tacky state was good, but the content of the caprolactone-modified acryl resin which was known to affect the elasticity the most was decreased, so the elastic restoring ratio and the image clarity were degraded.

According to the examples 1 and 2 of the present invention, the contents of the caprolactone-modified acryl resin, the acryl polyol, and the polyurethane resin were optimally used. It was confirmed that the image clarity which corresponded to the items of the exterior was good, and the elastic restoring ratio and the elongation at break which were the elasticity items were increased, and the tacky state was minimized, and the heat resistance, the water resistance and the weather resistance which were related to the durability of the coating were satisfied.

The coating composition according to the present invention therefore is able to enhance the strength of the tempered glass. Accordingly, the coating composition can provide the enhanced impact resistance and reliability which are required in the field of the glass components of the vehicle, so passengers in the vehicle can be safely protected from the shattering of glass when the glass is broken.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A coating composition comprising:
   (a) an amount of about 50 to 60% by weight of a caprolactone-modified acryl resin component;
   (b) an amount of about 10 to 20% by weight of an acryl polyol component;
   (c) an amount of about 10 to 20% by weight of a polyurethane resin component;
   (d) an amount of about 0.1 to 1.5% by weight of a reaction catalyst;
   (e) an amount of about 0.1 to 1.5% by weight of a wet additive;
   (f) an amount of about 1.0 to 1.5% by weight of a pigment; and
   (g) an amount of about 5 to 20% by weight of a solvent, all the % by weights based on the total weights of the components (a)-(g),
   wherein the coating composition further comprises a hexamethylenediisocyanate trimer resin as a hardener.

2. The coating composition of claim 1, wherein (a) the caprolactone-modified acryl acrly resin is present in a solid content of about 70 wt % based on the total weight of the caprolactone-modified acryl resin component, and a weight-average molecular weight of the caprolactone-modified acryl resin is of about 8,000 to 20,000, and a hydroxyl group content is of about 1 to 4%.

3. The coating composition of claim 1, wherein (b) the acryl polyol is present in a solid content of about 55 wt % based on the total weight of the acryl polyol component, a weight-average molecular weight of the acryl polyol is of about 12,000 to 25,000, a hydroxyl group content is of about 0.2 to 2%, and a glass transition temperature of the acryl polyol is of about 70 to 80° C.

4. The coating composition of claim 1, wherein (c) the polyurethane resin has a hydroxyl group content of about 0.5 to 1.0 wt % based on the total weight of the polyurethane resin, and a weight-average molecular weight of the polyurethane resin is of about 40,000 to 43,000, and the polyurethane resin is present in a solid content of about 70 to 80% based on the total weight of the polyurethane resin component.

5. The coating composition of claim 1, wherein (d) the reaction catalyst is dibutyltindilaurate.

6. The coating composition of claim 1, wherein a mixing weight ratio between the total weights of (a) the caprolactone-modified acryl resin component; (b) the acryl polyol component; (c) the polyurethane resin component; (d) the reaction catalyst; (e) the wet additive; (f) the pigment; and (g) the solvent to the hardener is of about 2 to 4:1.

7. The coating composition of claim 1, wherein a ford cup (FORD CUP#4, 25° C.) viscosity of the coating composition is of about 18 to 20 seconds.

8. The coating composition of claim 1, wherein the coating composition is transparent.

9. The coating composition of claim 1, wherein the coating composition is opaque.

10. The coating composition of claim 1, consisting essentially of:
    (a) an amount of about 50 to 60% by weight of a caprolactone-modified acryl resin component;
    (b) an amount of about 10 to 20% by weight of an acryl polyol component;
    (c) an amount of about 10 to 20% by weight of a polyurethane resin component;
    (d) an amount of about 0.1 to 1.5% by weight of a reaction catalyst;
    (e) an amount of about 0.1 to 1.5% by weight of a wet additive;
    (f) an amount of about 1.0 to 1.5% by weight of a pigment; and
    (g) an amount of about 5 to 20% by weight of a solvent, all the % by weights based on the total weights of the components (a)-(g) and the hexamethylenediisocyanate trimer resin as a hardener.

11. The coating composition of claim 1, consisting of:
    (a) an amount of about 50 to 60% by weight of a caprolactone-modified acryl resin component;
    (b) an amount of about 10 to 20% by weight of an acryl polyol component;
    (c) an amount of about 10 to 20% by weight of a polyurethane resin component;
    (d) an amount of about 0.1 to 1.5% by weight of a reaction catalyst;
    (e) an amount of about 0.1 to 1.5% by weight of a wet additive;
    (f) an amount of about 1.0 to 1.5% by weight of a pigment; and
    (g) an amount of about 5 to 20% by weight of a solvent, all the % by weights based on the total weights of the components (a)-(g) and the hexamethylenediisocyanate trimer resin as a hardener.

12. A coated tempered glass comprising:
    a tempered glass;
    a primer layer formed on a surface of the tempered glass; and
    a coating layer formed from the coating composition of claim 1, wherein the coating layer is on the primer layer.

13. The tempered glass of claim 12, wherein the primer layer is formed by coating with a silane primer.

14. The tempered glass of claim 12, wherein a pre-primer layer is formed between the tempered glass and the primer layer, and the pre-primer layer is a transparent layer formed with a silane primer.

15. The tempered glass of claim 12, wherein the primer layer is formed at a width of about 5 to 15 cm at an outer edge of the tempered glass.

16. The tempered glass of claim 12, wherein the coating layer has an average thickness of about 50 to 80 μm, and the coating layer is coated on a portion where the primer layer is formed or is coated on a front surface of the tempered glass which includes the primer layer.

17. A method of manufacturing a coated tempered glass, comprising:
   coating a primer on a surface of a tempered glass to form a primer layer;
   coating a coating composition of claim 1 on the primer layer; and
   hardening the coating composition at a temperature of about 70 to 90° C for about 20 to 40 minutes.

18. A vehicle panorama roof comprising a coated tempered glass of claim 12.

19. A vehicle comprising a coating layer formed from the coating composition of claim 1.

* * * * *